(12) United States Patent
Lewin-Eytan et al.

(10) Patent No.: US 10,897,447 B2
(45) Date of Patent: Jan. 19, 2021

(54) COMPUTERIZED SYSTEM AND METHOD FOR AUTOMATICALLY PERFORMING AN IMPLICIT MESSAGE SEARCH

(71) Applicant: VERIZON MEDIA INC., New York, NY (US)

(72) Inventors: Liane Lewin-Eytan, Haifa (IL); Irena Grabovitch-Zuyev, Haifa (IL); Noa Avigdor-Elgrabli, Haifa (IL); Yoelle Maarek, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 77 days.

(21) Appl. No.: 15/805,471

(22) Filed: Nov. 7, 2017

(65) Prior Publication Data

US 2019/0140997 A1    May 9, 2019

(51) Int. Cl.
*H04L 12/58* (2006.01)
*G06Q 10/10* (2012.01)
*G06F 3/0482* (2013.01)
*G06F 3/0484* (2013.01)

(52) U.S. Cl.
CPC .......... *H04L 51/22* (2013.01); *G06Q 10/107* (2013.01); *G06F 3/0482* (2013.01); *G06F 3/04847* (2013.01); *H04L 51/16* (2013.01)

(58) Field of Classification Search
CPC ....... H04L 51/16; H04L 51/22; G06F 3/0482; G06F 3/04847
USPC ...................................................... 709/206
See application file for complete search history.

(56) References Cited

U.S. PATENT DOCUMENTS

| | | | | |
|---|---|---|---|---|
| 7,707,255 B2 * | 4/2010 | Satterfield | ............. | G06F 3/0481 709/206 |
| 2005/0004990 A1 * | 1/2005 | Durazo | ................ | G06Q 10/107 709/206 |
| 2007/0156732 A1 * | 7/2007 | Surendran | ............ | G06Q 10/107 |
| 2009/0106375 A1 * | 4/2009 | Carmel | ............... | G06F 17/2211 709/206 |
| 2010/0262922 A1 * | 10/2010 | Fan | ....................... | G06Q 10/107 715/752 |

FOREIGN PATENT DOCUMENTS

| | | | | | |
|---|---|---|---|---|---|
| GB | | 2499745 A | * | 8/2013 | ............. H04L 51/04 |
| WO | WO-2007075237 A1 | * | 7/2007 | ........... G06Q 10/107 |

* cited by examiner

*Primary Examiner* — Zi Ye
(74) *Attorney, Agent, or Firm* — James J. DeCarlo; Greenberg Traurig, LLP

(57) ABSTRACT

Disclosed are systems and methods for improving interactions with and between computers in content searching, hosting and/or providing systems supported by or configured with devices, servers and/or platforms. The disclosed systems and methods automatically perform an implicit message search without requiring or actually receiving a user search query. The disclosed search framework automatically identifies of a set of messages in a mailbox that are related to a specific message m, and this message set is presented to the user from within the mailbox. The message set is retrieved without a user formulating and entering a search query, or without having to switch the state of the mailbox. The retrieved messages are provided as a type of "thread" functionality that provides a "thread" for those messages having related subject matter to message m.

19 Claims, 9 Drawing Sheets

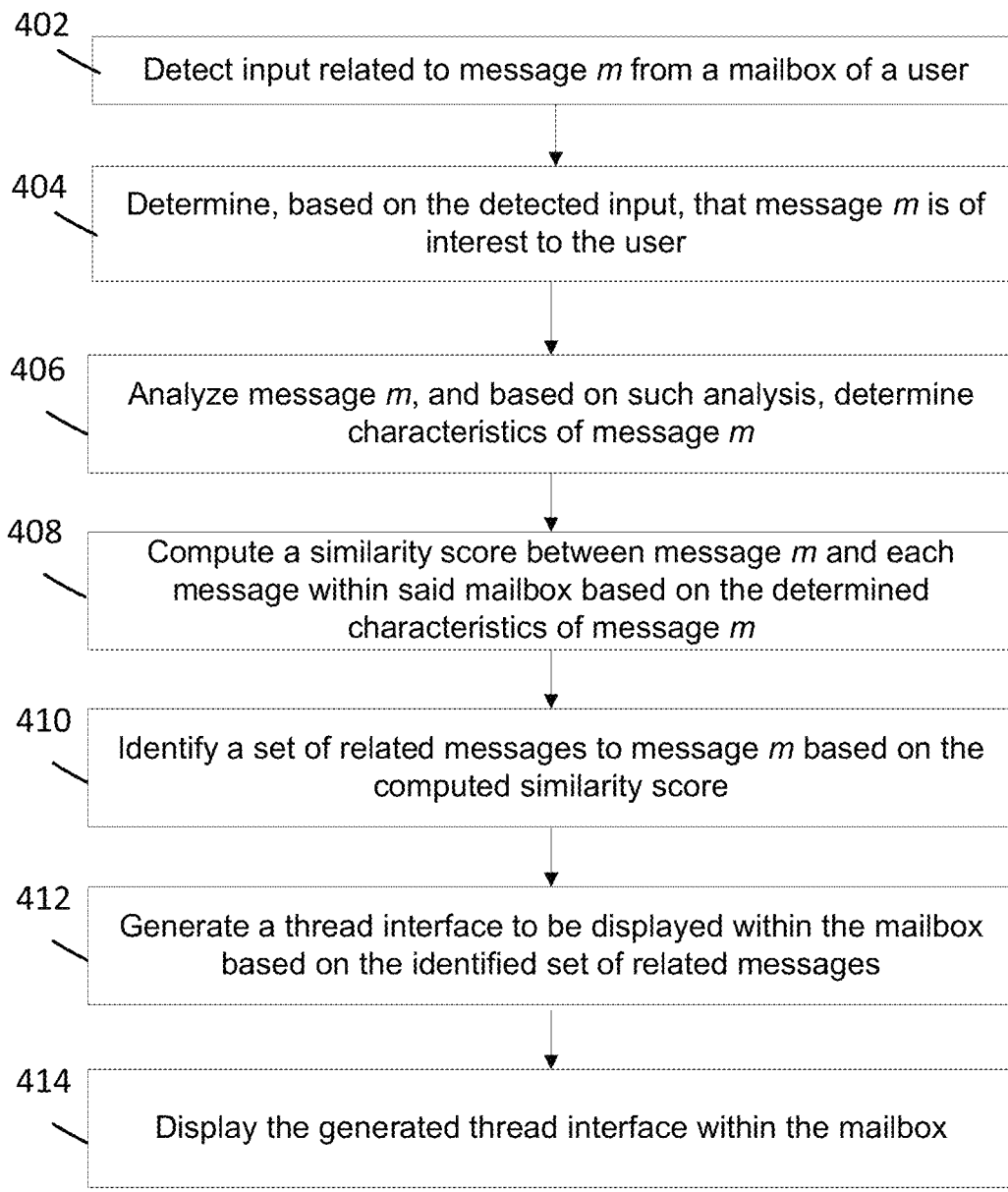
FIG. 4                    400

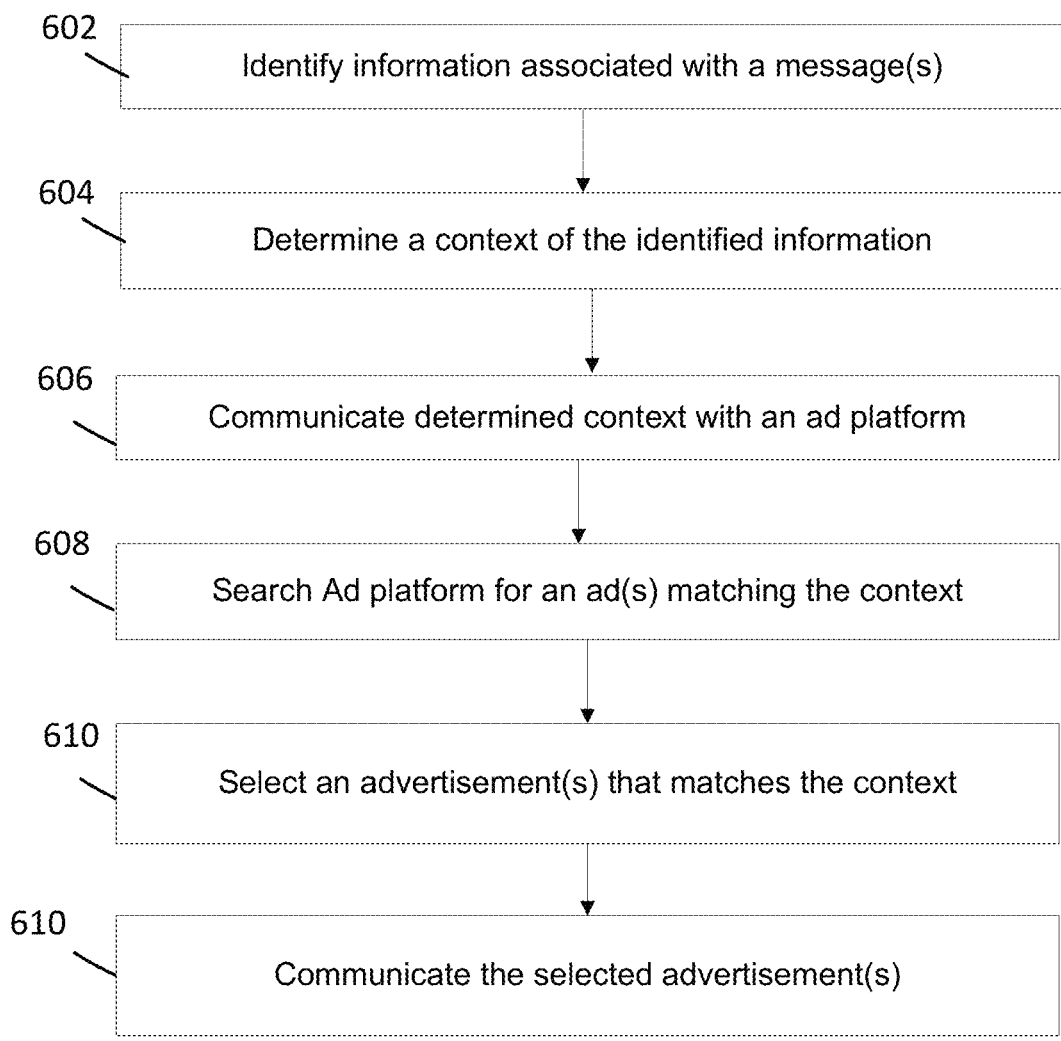

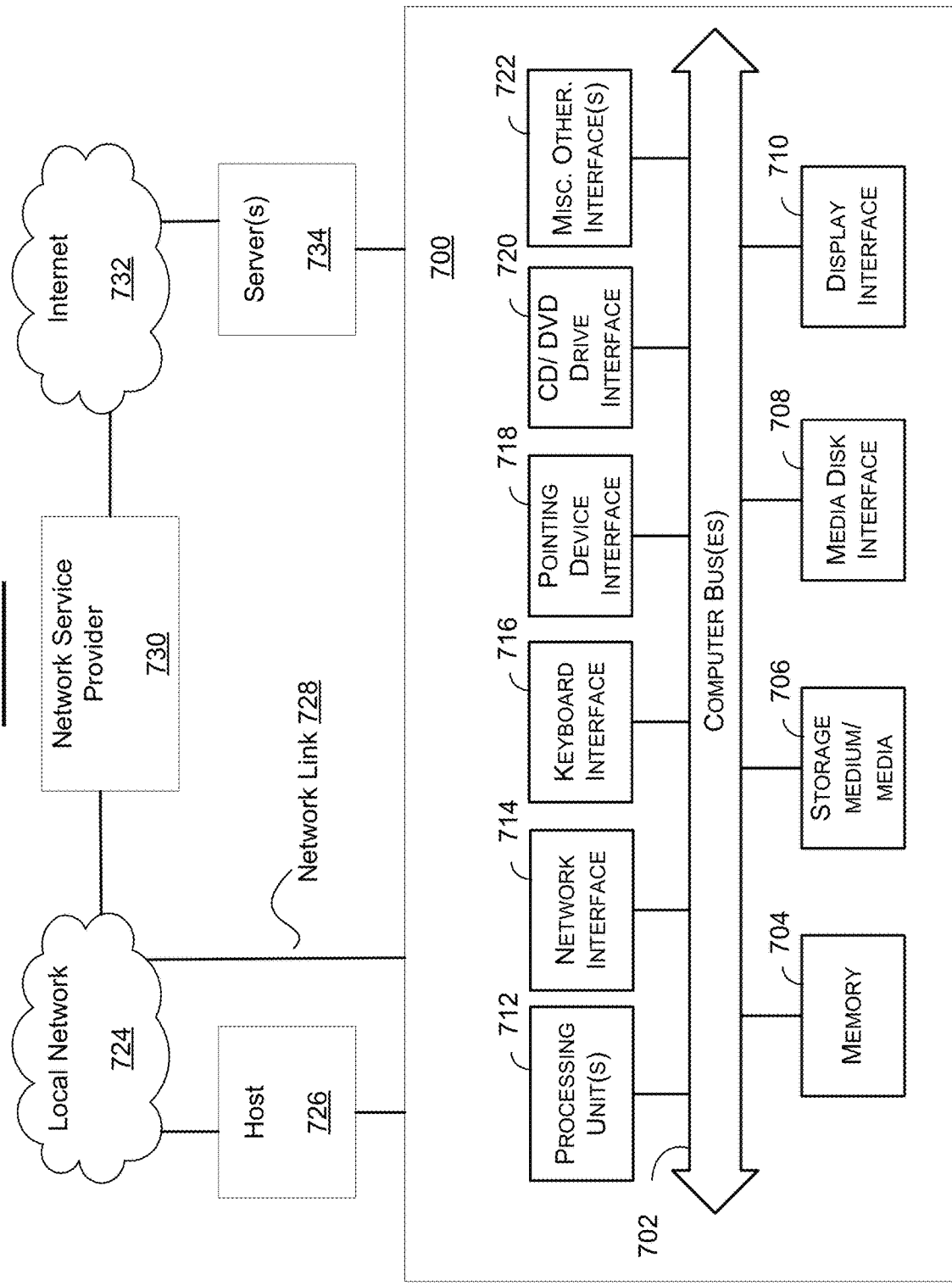

COMPUTERIZED SYSTEM AND METHOD FOR AUTOMATICALLY PERFORMING AN IMPLICIT MESSAGE SEARCH

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of messaging and searching devices, systems and/or platforms by modifying the capabilities and providing non-native functionality to such devices, systems and/or platforms for a novel and improved framework for automatically performing interprocess communication (IPC) within a message platform resulting in an implicit message search without requiring or receiving a search query from a user.

SUMMARY

Electronic mail (email) traffic keeps increasing, which is mainly dominated by machine generated traffic, and in order to keep up, web mail services continue to offer more and more storage. In addition, users rarely delete messages (82% never delete a single message), and even more rarely organize their messages in folders (70% never define a single folder, and out of the 30% who do, only 10% actually use them). The outcome of the above is a mailbox that serves as data store (often considered specifically as such by the user), and in which it is rather difficult to retrieve specific messages. While the default mechanism for retrieving past messages is search, it is still sparsely used in Web mail, and even considered difficult and time consuming by many.

The disclosed systems and methods provide a search framework that provides capabilities for identifying a set of related messages from within a messaging platform in a direct and intuitive way without specifying or even requiring a query to initiate the search session. As discussed in more detail below, the set of related messages is defined with respect to a message m, which is a message that a user has demonstrated interest in. According to some embodiments, interest can be demonstrated, expressed, determined, extracted, derived or otherwise identified via the disclosed search framework based on user actions with message m. For example, such interest can be based upon an operation that leads to the message m being marked in the inbox view, can involve an operation that selects message m, an operation that involves returning to the inbox view after having clicked and opened message m, an operation involving moving the cursor between message m and other messages, an operation involving replying, forwarding, deleting, saving and the like, message m, and the like, or some combination thereof.

Thus, whenever user interest in message m is detected, messages related to message m are retrieved and displayed marked. Related messages can be displayed in various ways (as discussed in more detail below and depicted in FIGS. 5A-5C, which provide non-limiting embodiments illustrating the non-native functionality the disclosed search framework provides for displaying messages from within a messaging user interface (UI)), but in all cases, they will be presented to the user without the need of the user to take any explicit action or alteration of the UI view within the message platform.

While the instant disclosure will be discussed with reference to message search, it should not be construed as limiting, as any known or to be known type of content item, data item, or information object locatable over a network or within a storage or repository can be searched for and identified via the search framework discussed herein.

Thus, the disclosed systems and methods provide a search framework for implicitly performing a message search via an interprocess communication (IPC) within a messaging platform without requiring or actually receiving a user search query. The search framework discussed herein identifies of a set of messages from a mailbox that are related to a specific message m, which is determined to be the user's current object of interest. As discussed herein, when the user looks at message m, or expresses his interest in message m using any mail operation that highlights message m, the set of messages that are closely related to message m will be presented to the user.

Thus, the disclosed systems and methods provide a new way of retrieving messages, and such retrieval is performed without the need to formulate or receive a query, and without the requirement to switch to an alternate message search state within the mailbox (e.g., no need to switch between windows, tabs, UI displays in order to execute a search on the message platform). As evidenced from the disclosure herein, the disclosed search framework can be executed from within any message or mailbox view within a messaging platform, application, system or service (i.e., without having to switch to a respective message search functionality portion or window), and provides functionality that expands upon the "thread" notion of related messages. While normal "thread" messages originate from a singular seed message and correspond from the same line of correspondence, the instant disclosure provides "thread" functionality that is not bound by these constraints, and focuses solely on providing a "thread" for those messages that have related subject matter to a identified message of interest.

In accordance with one or more embodiments, the instant disclosure provides computerized methods for executing the search framework discussed herein, as well as a non-transitory computer-readable storage medium for carrying out the above mentioned technical steps of the search framework. The non-transitory computer-readable storage medium has tangibly stored thereon, or tangibly encoded thereon, computer readable instructions that when executed by a device (e.g., messaging server, client device, and the like) cause at least one processor to perform a method for a novel and improved framework for automatically performing an implicit message search without requiring or receiving a search query from a user, thereby identifying a set of messages related to a message of interest.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure;

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
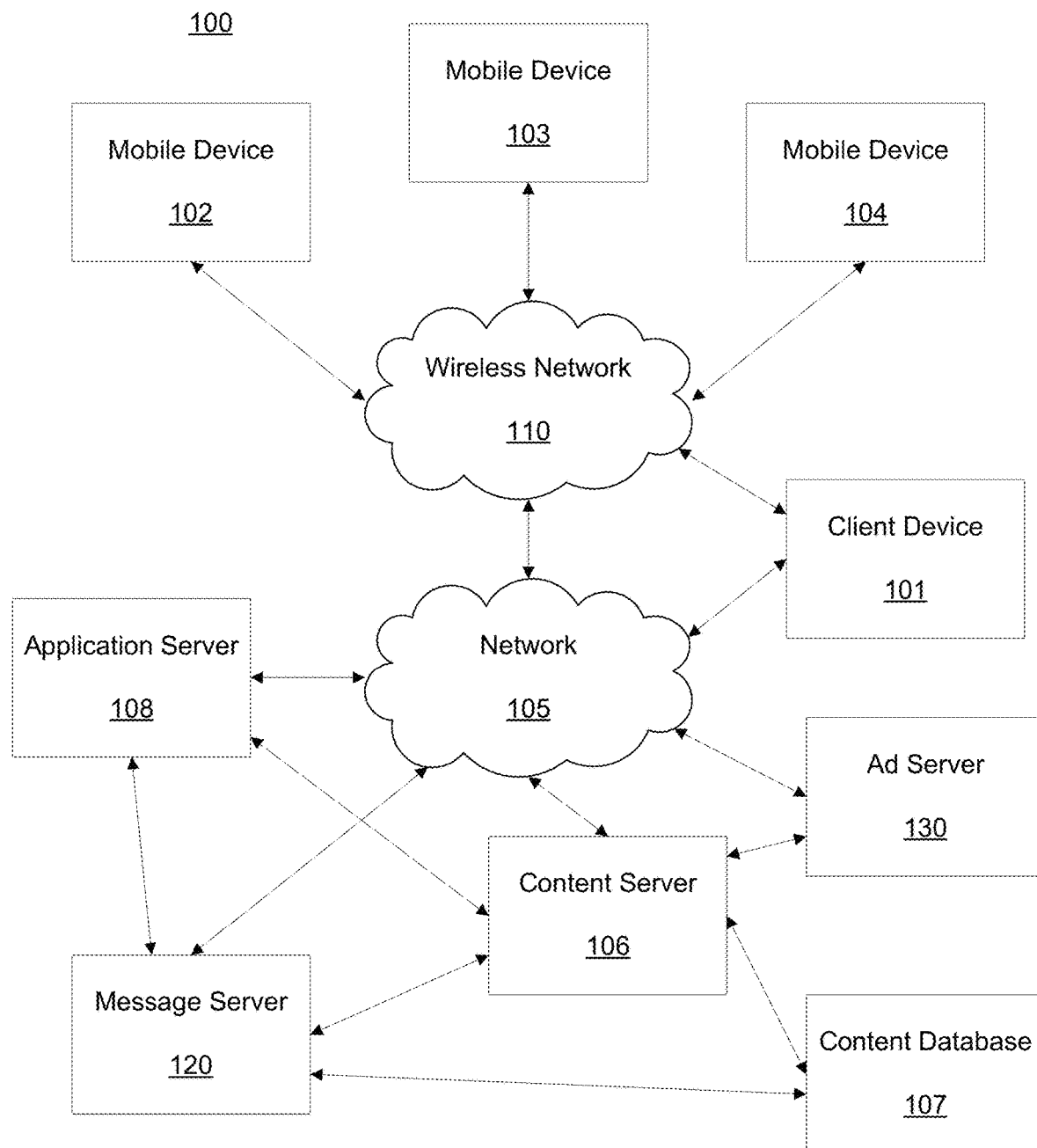
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide a novel search framework for message platforms and services, and their provided mailboxes and user interfaces (UI), for automatically performing a search of a mailbox without actually receiving or even requiring a search query to be provided by a user.

The disclosed systems and methods are embodied within a search framework (and implemented via search engine 300 from FIG. 3, as discussed in more detail below) which provides non-native functionality to a messaging platform/service that involves determining that a message m within a mailbox is of interest to a user, then leveraging this information in order to automatically search, identify and display of a set of related messages. The search framework discussed herein does not require a search query or execution of the native search functionality resident on the message platform hosting the mailbox; rather, the disclosed search framework automatically executes a set of instructions upon determining (or identifying) that a user is interested in a particular message (i.e., message m, as referenced herein).

As discussed in more detail below, such identification that the message m is of interest can be based on a variety of factors, including, but not limited to, for example, a type, an amount and/or a frequency of user interaction with the message (e.g., when the user looks at message m, or uses any mail or computer operation that highlights message m), and the like, or some combination thereof.

Figure 5A:
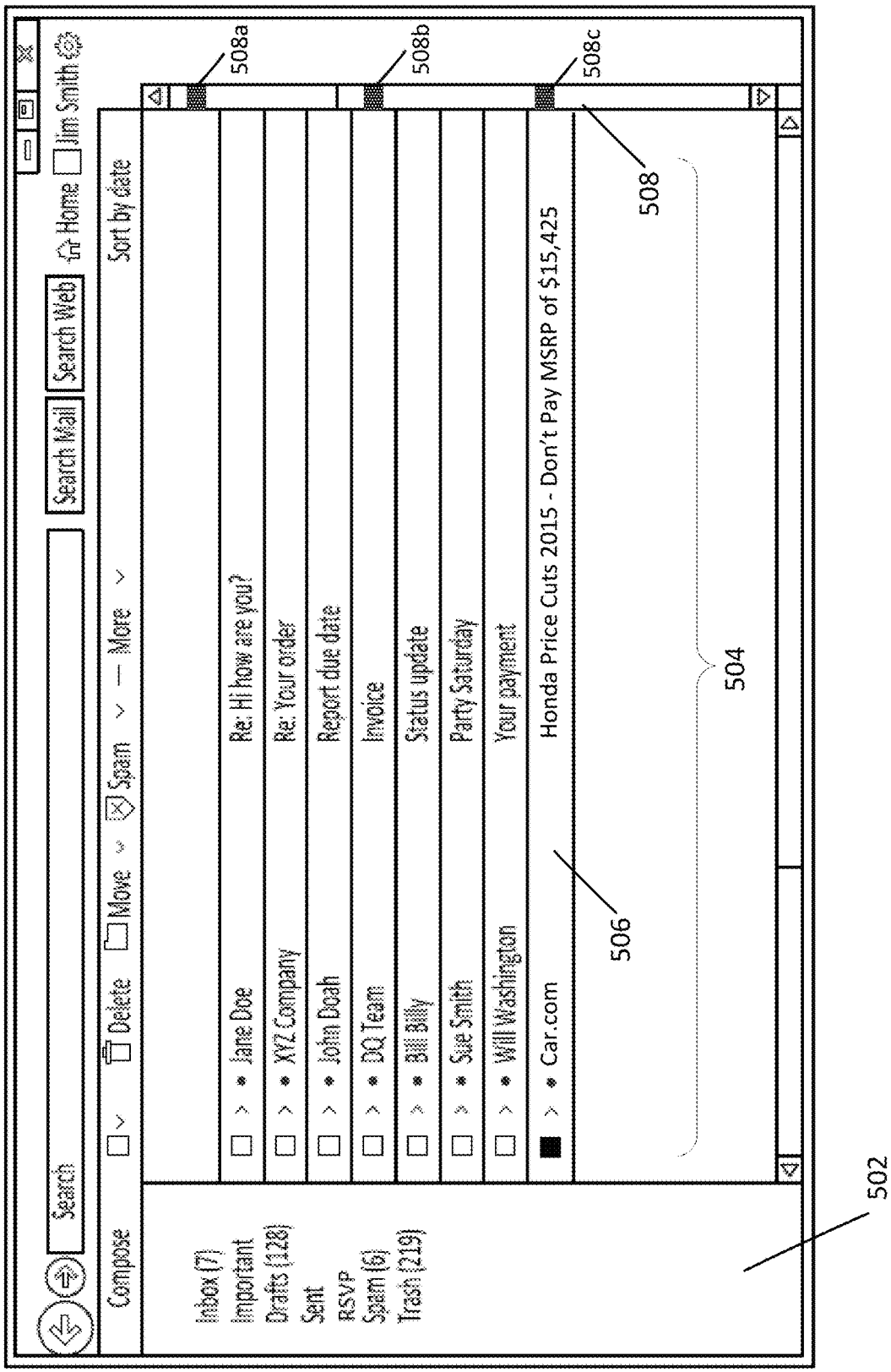
FIGS. 5A-5C illustrate non-limiting embodiments of a message search according to some embodiments of the present disclosure.
Figure 5B:
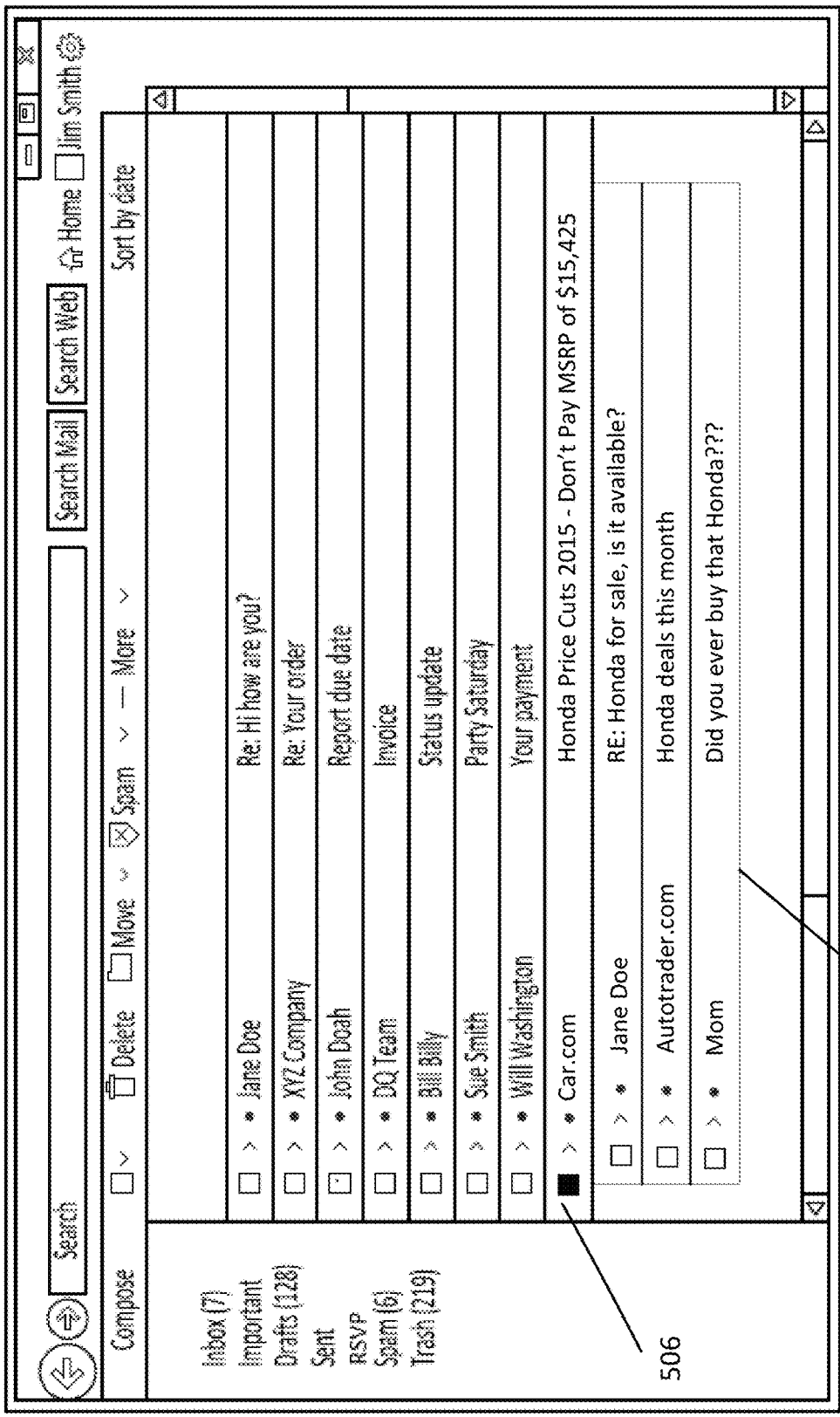
Figure 5C:
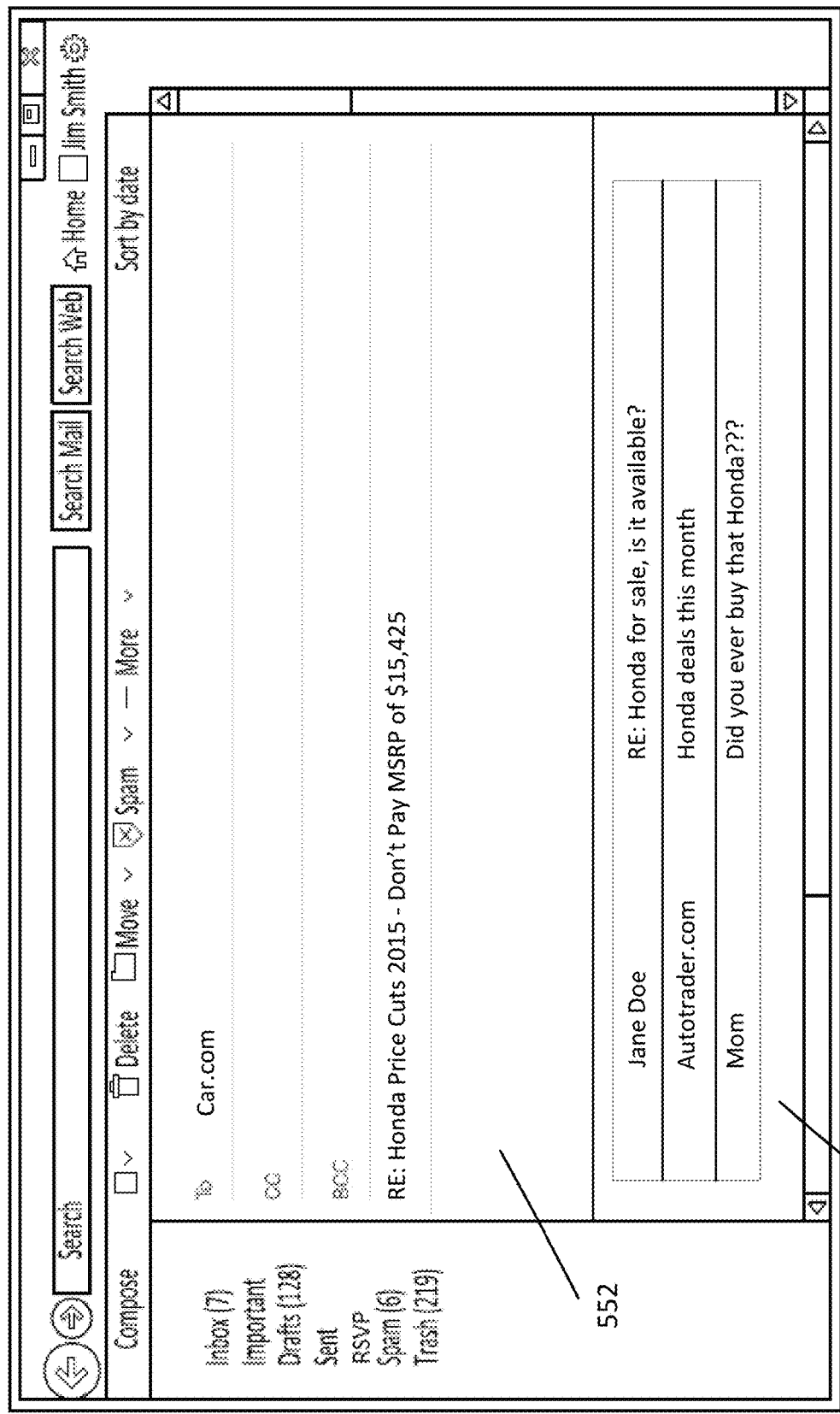

As such, according to some embodiments of the instant disclosure, upon identifying the message of interest (message m), the search framework automatically identifies related messages within the user's mailbox, retrieves them, then presents them to the user from within the mailbox view (as illustrated in FIGS. 5A-5C, and discussed in more detail below).

As discussed in more detail below (see FIG. 4 discussion below), the related messages are identified based on a similarity analysis between message m and the other messages in the user's mailbox. The disclosed similarity analysis results in a determination as to which messages are related to message m (e.g., directed to the same context), and not simply identifying which messages are similar in structure, sender and the like, as is evident from the discussion herein. The disclosed similarity analysis involves performing a n-dimensional analysis of each message based on features including, but not limited to, i) time, ii) contact relationships and iii) content similarity, as discussed below. The discussed analysis below utilizes a three-dimensional similarity analysis technique; however, the amount of features used to compare messages can be extended to n-factors, thereby evidencing the n-dimensional analysis mentioned above. For example, such factors can include, but are not limited to, message HTML structure, message language, style of the message, and the like.

According to some embodiments, the similarity analysis performed in identifying the set of messages related to message m can be based on a proximity factor (or value) that is personalized to a user of the mailbox and/or based on the mailbox content. As evidenced by the disclosure herein, the proximity value can be accounted for during the similarity analysis (mentioned above and discussed below) by identifying certain types of messages particular to, and frequently exchanged via the user's mailbox. For example, consider a receipt message for an online order of clothes. The set of related messages for a user who rarely orders online could be her previous online orders. For another user who buys online frequently, the set of related messages could comprise online orders of clothes of even more specificity: orders of clothes from the same retailer.

While the discussion herein focuses on identifying a single message of interest and then identifying related messages to that identified message, it should not be construed as limiting, as any number of messages can be identified as interesting to the user, and any number of sets of related messages (e.g., overlapping sets of messages) can be identified by the executed search framework discussed herein without departing from the scope of the instant disclosure.

Thus, the disclosed systems and methods provide a new way of retrieving messages within a messaging platform. Such message retrieval is performed without the need of formulating or receiving a query, and/or switching to a message search state within the mailbox. As evidenced from the disclosure herein, the disclosed search framework can be executed from within any view within a messaging platform, application, system or service, and provides advanced functionality that expands upon the "thread" notion of related messages by providing "thread" functionality that disregards conventional message grouping constraints in typical conversational "threads", and provides a "thread" directed to solely providing related messages unhindered from their source or location within the mailbox.

As discussed in more detail below at least in relation to FIG. 6, according to some embodiments, information associated with, derived from, or otherwise identified from, during or as a result of a message identification, search and display, as discussed herein, can be used for monetization purposes and targeted advertising when providing, delivering or enabling such devices access to messages, media and/or applications provided over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message (or messaging) server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOW) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or content server 106, message server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/ connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
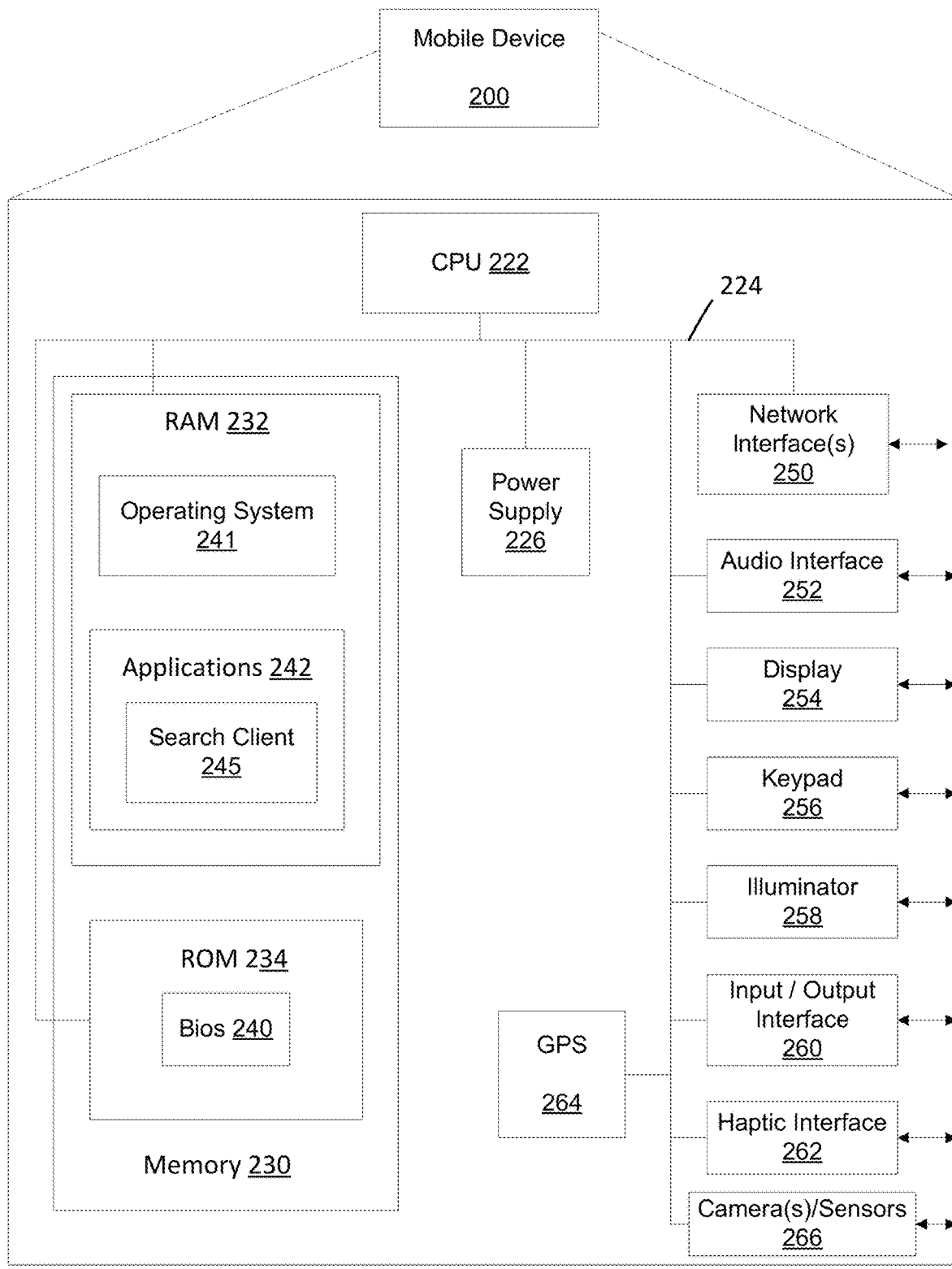
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/ sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-6.

Figure 3:
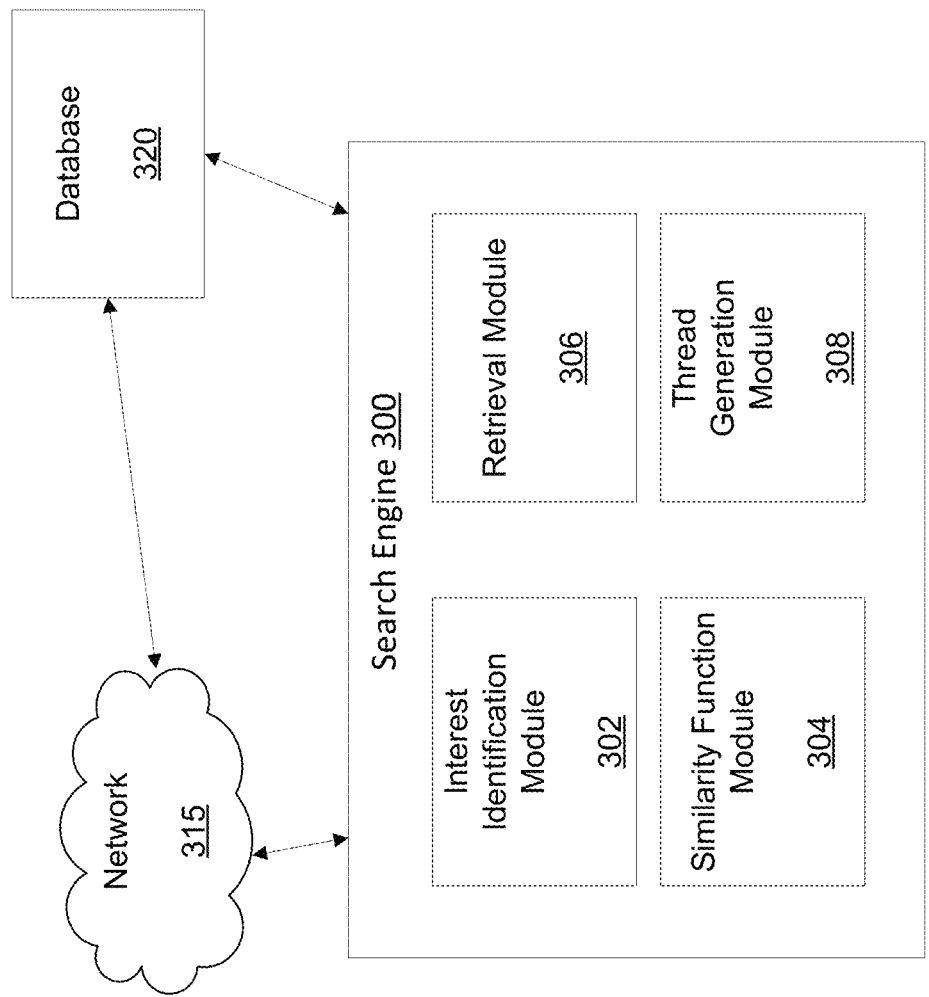
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a search engine 300, network 315 and database 320. The search engine 300 can be a special purpose machine or processor and could be hosted by a messaging server, application server, content server, social networking server, web server, search server, content provider, email service provider, ad server, user's computing device, and the like, or any combination thereof.

According to some embodiments, search engine 300 can be embodied as a stand-alone application that executes on a user device. In some embodiments, the search engine 300 can function as an application installed on the user's device, and in some embodiments, such application can be a web-based application accessed by the user device over a network. In some embodiments, the search engine 300 can be installed as an augmenting script, program or application to another messaging and/or media content hosting/serving application, such as, for example, Yahoo! ® Mail, Yahoo! ® Messenger, Yahoo!® Search, Flickr®, Tumblr®, Twitter®, Instagram®, SnapChat®, Facebook®, and the like.

The database 320 can be any type of database or memory, and can be associated with a content server on a network (e.g., content server 106, message server 120, ad server 130 or application server 108 from FIG. 1) or a user's device (e.g., device 101-104 or device 200 from FIGS. 1-2). Database 320 can comprise, for example, a dataset of content items, device data and associated metadata, and user data and associated user metadata. Such information can be stored in the database 320 independently and/or as a linked or associated dataset. It should be understood that the data (and metadata) in the database 320 can be associated with any type of content, user, device or network information and type, whether known or to be known, without departing from the scope of the present disclosure.

Database 320 comprises a dataset of data and metadata associated with content items. For purposes of the present disclosure, reference to content items will be made with regard to electronic messages (comprising digital content) as a whole; however, it should not be construed to limit the applications of the systems and methods discussed herein. While reference is made throughout the instant disclosure to electronic messages, other forms of electronic documents or transmissions (e.g., Short Message Service (SMS) messages, Multi-media Message Service (MMS) messages, and the like) can be communicated and/or accessed and processed by the search engine 300 according to the systems and methods discussed herein. For example, detection of a message as message m can be based on any type of item within a message or electronic document or file, and such items can include any type of known or to be known form of digital content, whether as a whole file or included within a file, including, messages, text, audio, video, short form videos, multi-media, and the like.

The messages and the data and metadata of such messages processed according to the disclosed systems and methods, and stored in database 320, can be any type of message. Examples of such messages can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages can be provided to the search engine 300 or accessed by a computer program or device that can access the messages. In some embodiments, the messages can be stored in a database of stored messages 320, which is associated with an email provider, such as Yahoo! Mail®.

Database 320 can also comprise a dataset of data and metadata associated with local and/or network information related to users, devices, services, applications, user-generated content, third party provided content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user account(s), user interests, user behavioral information, user attributes, user preferences or settings, user demographic information, user location information, user biographic information, and the like, or some combination thereof.

According to some embodiments, the user data can also include, for purposes searching, receiving and/or displaying messages, rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, messaging platforms, applications, sites, or providers that enable users to send, receive, search for, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, and the like). In some embodiments, database 320 can comprise data and metadata associated with such information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the search engine 300, and the database of stored resources 320. Indeed, as illustrated in FIG. 3, the search engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as search engine 300, and includes interest identification module 302, similarity function module 304, retrieval module 306 and thread generation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

According to embodiments discussed herein, as evidenced from the disclosure below related to FIG. 4, the search engine 300 executes and/or implements each of the modules (e.g., 302-308) in order to perform an IPC among the co-executing search and messaging functionalities of the message platform/device thereby coordinating the search and mail activities among different program processes that are running concurrently on the message platform, application, OS, device, and the like. In some embodiments, the IPC can be an interprogram communication when the search engine 300 is functioning as an augmenting script, program or application to another messaging and/or media content hosting/serving application, as discussed above.

Turning to FIG. 4, Process 400 details steps performed in accordance with some embodiments of the present disclosure for retrieving and displaying a related set of messages within displayable thread interface within a messaging platform's user interface (UI).

Steps 402-406 of Process 400 are performed by the interest identification module 302 of the search engine 300; Step 408 is performed by the similarity function module 304; Steps 410 is performed by the retrieval module 306; and Steps 412-414 are performed by the thread generation module 308.

Process 400 begins with Step 402 where the search engine 300 monitors activity in relation to messages within a user's inbox, and during such monitoring, identifies interactions occurring between the user and a message m.

As discussed above, such interactions can be any type of user and/or system activity that occurs within a user's inbox, including, but not limited to, receiving a new message (where the new message is message m or corresponds to message m (e.g., is a reply to message m)), the user drafting message m, viewing message m, forwarding message m, saving message m, deleting message m, responding to a message with message m, and/or any other type of communication operation performed respective to message m, changing the view of message m within the UI of the user's mailbox, flagging or marking message m, categorizing message m (e.g., moving it to a specific folder), hovering an interface object (e.g., mouse pointer) over message m, and the like, or some combination thereof.

Thus, Step 402 involves identifying what types of interactions and/or activities are occurring respective to message m within a user's mailbox.

In Step 404, a determination is performed by the search engine 300 that message m is a message of interest to the user based on the detected input related to message m. According to some embodiments, this determination can be based on a preset or predetermined listing of operations that define what types of interactions user's typically perform on messages of interest. For example, Step 402 involves identifying that message m was moved to a specific folder, and this can indicate that message m is of interest to the user. However, which type of folder can play a major factor in determining whether the message is important or not. For example, if the folder is a "spam" folder, then obviously message m is not of interest; however, if the folder is a folder that was user generated (e.g., not a mailbox provided folder), then this can be understood by the search engine 300 as to an operation that identifies message m as a message of interest to the user.

In some embodiments, the listing of operations used to identify detected input as related to a message of interest can be predefined by the user, the system, search engine 300, an administrator or the like. In some embodiments, the listing of operations can be defined according to learned activities by a user. For example, should a new message detected in a user's inbox always be subject to at least 1 of 3 actions by a user, then these 3 actions could be (or at least 1 of them) determined to be related to, and thereby used to identify messages of interest to that specific user.

In Step 406, having determined that message m is a message of interest to the user, message m is analyzed, and based on the analysis, its features are identified (features are interchangeably referred to as attributes, characteristics, values, measures and the like, which all refer to the specific data and metadata contained within and defining the message m).

According to some embodiments, such analysis occurring in Step 406, can be performed by implementing and/or executing any known or to be known software or technology that performs, but is not limited to, content extraction, natural language processing (NLP), n-gram analysis, vector translation and analysis, and the like, or some combination thereof. Therefore, as a result to Step 404, the search engine 300 parses, identifies then extracts the features of the message m.

According to some embodiments, and discussed in more detail below, the identified message features of message m correspond to, but are not limited to, time data related to message m (e.g., when was it received and/or when was it interacted with thereby being identified in Steps 402-404 as an interesting message), contacts data (e.g., the identity of the sender and recipient(s) of message m) and content data providing an indication as to the content included in message m (which can be utilized to determine a type of context for which similar messages can be identified). These time, contacts and content features are utilized to identify related messages that have corresponding time, contacts and content features, as discussed in relation to Steps 408-410.

In Step 408, the search engine 300 computes a similarity score (also referred to and understood as a "relatedness score") between message m and a pool of messages within the mailbox, which is used to identify a set of related messages from within the initial pool of messages (as in Step 410, discussed below). In some embodiments, the pool of messages includes each and every other message in the mailbox; however, due to some mailboxes having an extremely large amount of messages, in some embodiments, the pool of messages includes only those messages that satisfy a criteria. The criteria can include, but is not limited to, messages received within a predetermined time frame (e.g., within the past week), messages saved/stored in the same folder, messages from the same sender, messages sent to the same recipient, messages receiving a similar type of interaction as message m, and the like, or some combination thereof.

For example, if message m was identified because it was categorized into a folder labeled "work", then in some embodiments, the pool of messages serving as the basis for the computation of a similarity score with message m can be only those messages also saved in the "work" folder.

Step 408 involves the search engine 300 executing software defined by a similarity function $f$ that takes as input two messages (m1, m2) and computes their similarity based on three dimensions: i) time, ii) contacts and iii) content. Therefore, here m1 refers to message m, and m2 refers to another message in the pool of messages. As mentioned above, the similarity computation can be based on any number of dimensions without altering the scope of the disclosed systems and methods, as such dimensions directly correspond to the amount and type of attributes or features of the digital items being compared; however, for purposes of clarity of disclosure, only 3 dimensions will be discussed herein (time, contacts and content), which one of skill in the art would not limit the applicability of the disclosed search engine 300.

According to some embodiments, similarity function $f$ can be defined as follows:

$$f(m1,m2)=A(\text{sim\_\{time\}}(m1,m2),\text{sim\_\{contact\}}(m1,m2),\text{sim\_\{content\}}(m1,m2)) \quad \text{(Equation 1)},$$

where sim_{time}, sim_{contact}, and sim_{content} represent a similarity based respectively on the messages time, contacts and content, respectively, and A is an aggregating function of these similarity measures.

According to some embodiments, the similarity for each dimension is computed using aggregating function A over their respective measures. For example, consider dimension d, where $d\Sigma\{\text{time, contact, content}\}$, two messages (m1, m2), then the similarity measures $\text{sim}\{d\_s_1\}$, $\text{sim}\{d\_s_2\}, \ldots, \text{sim}\{d\_s_n\}$ corresponding to dimension d are represented as follows:

$$\text{Sim\_}\{d\}(m1, m2) = \sum_i c_i * sim\{d\_s_i\}(m1, m2) \bigg/ \sum_i c_i$$

According to a non-limiting example, a time similarity measurement is as follows:

sim_{time_diff_x}(m1, m2), where $x\Sigma\{\text{minutes, hours, weeks, months}\}$.

In this example, the time similarity function calculates the time difference between the reception times of the messages (m1, m2), and the values are calculated with respect to the time units (minutes, hours, weeks, months).

A non-limiting contacts similarity measure is as follows:

$$\text{sim\_}\{\text{contact\_}x\}(m1,m2), \text{ where } x\Sigma\{\text{to,from,cc,bcc}\}.$$

This contacts similarity function calculates the similarity between the contacts listed on each message, for example using Jaccard similarity.

According to some embodiments, a non-limiting example of a content similarity measurement is as follows:

$\text{sim\_}\{\text{content\_subj}\}(m1, m2)$, where such calculation is performed respective to the subject line of two messages.

According to some embodiments, such measurement involves performing textual similarity analysis of the messages subjects, which can be calculated via any type of known or to be known analysis technique, software or algorithm, including, but not limited to, cosine similarity using TF-IDF factors of the textual elements in the subject of the messages.

In another non-limiting example, a content similarity measurement is as follows:

$\text{sim\_}\{\text{content\_body}\}(m1, m2)$, where such calculation is performed respective to the content within the body of each of the two messages.

According to some embodiments, such measurement involves performing textual similarity analysis of the messages subjects, which can be calculated via any type of known or to be known analysis technique, software or algorithm, including, but not limited to, cosine similarity using TF-IDF factors of the textual elements in the body of the messages.

In another non-limiting example, a content similarity measurement is as follows:

$\text{sim\_}\{\text{content\_cat}\}(m1, m2)$, where such calculation is performed respective to the category designation of each message, which can be identified from content in the message body, message header, from the sender, recipient, the inbox itself, and the like, or some combination thereof.

In another non-limiting example, a content similarity measurement is as follows:

$\text{sim\_}\{\text{content\_extract}\}(m1, m2)$, where the similarity between extracted data of the two messages is computed. For example, extracted data corresponds to pieces of information from the original text of each message that have a contextual annotation. For example, "SFO" can be extracted with the annotation <airport_arrival>. These annotations can be compared and their similarity can be computed according to like mechanisms discussed above in relation to determine content similarity measurements.

In further non-limiting examples, additional content similarity measurements can be performed according to $\text{sim\_}\{\text{content\_struct}\}(m1, m2)$, where the similarity between the HTML structure of the two messages is computed, and $\text{sim\_}\{\text{content\_url}\}(m1, m2)$, where the similarity between the links within the bodies of the two messages is computed. Such computations can also be performed by any known or to be known similarity analysis techniques, as discussed above.

According to some embodiments, the determination of the content similarity between two messages can be based on an aggregate of each of the above (and additionally provided) content features. For example, a determination of a content similarity between two messages can be as follows:

$$\Sigma \text{ or } A(\text{sim\_}\{\text{content\_body}\}(m1,m2),$$
$$\text{sim\_}\{\text{content\_subj}\}(m1,m2), \text{sim\_}\{\text{content\_cat}\}$$
$$(m1,m2), \text{sim\_}\{\text{content\_extract}\}(m1,m2),$$
$$\text{sim\_}\{\text{content\_struct}\}(m1,m2), \text{sim\_}\{\text{content\_url}\}$$
$$(m1,m2)).$$

It should be understood that the above listing of similarity measurements is non-limiting, and is solely put forth for purposes of providing clarifying examples of how time, contacts and content features can be leveraged in order to determine the similarity between two messages.

Therefore, according to some embodiments, Step 408 involves computing a similarity score for message m against each message in the pool of messages. This similarity score is based on the result of Equation 1, discussed above.

In some embodiments, search engine 300 can periodically perform a similarity score computation for each message in a mailbox. This can be beneficial to the system for a variety of reasons. One benefit is the ability to have real-time similarity scores to messages currently in the mailbox as the scores can be continually computed, dynamically updated and retained such that a dynamic display of similar messages according to when they were compiled can be provided to a user (see FIG. 5A, discussed below). Another benefit is when a message is identified as being of interest (i.e., Step 404), Process 400 can skip steps 406-408 and retrieve the previously executed similarity score data for each message and proceed directly to Step 410. These embodiments can be performed offline or online in parallel to the steps of Process 400. In some embodiments, the similarity score computation of Step 410 can be performed on demand.

In some embodiments, the performance of such parallel similarity score analysis can be based upon an identified trigger. Such trigger can be, for example, receiving a new message or expiration of a predetermined time period. Therefore, for example, upon receiving a new message, the search engine 300 executes Equation 1 for each message in the mailbox (or within the pool of messages), and stores the determined similarity data for each message in database 320. When message m is then identified, the similarity information for message m against each other message can be retrieved.

In some embodiments, this parallel analysis of Step 408 can expedite the search and retrieval process. That is, instead of having to perform the computation in real-time (e.g., upon identification of message m), the search engine 300 can perform this in parallel or prior to Step 402, whereby upon identification of message m, the similarity data is already computed and ready for usage within Step 410, as discussed below.

Continuing with Process 400, after identifying message m, and the similarity score of each message in the pool of messages to message m (based on each messages', inclusive of message m, time, contacts and content features), Process 400 proceeds to Step 410 where a set of related messages to message m is identified. In some embodiments, each message from the pool having a similarity score satisfying a threshold is selected. The threshold signifies a similarity level with message m, where in order to satisfy the threshold, the total score of the message, being an aggregate of the time, contacts and content scores (from Equation 1), at least satisfies the threshold. Those messages with similarity scores failing to satisfy the threshold are not selected for Step 412, and in some embodiments, are discarded.

In Step 412, a thread interface is generated, where the interface comprises interactive objects that respectively display each of the messages selected in Step 410. As understood by those of skill in the art, the generated thread is an interface feature added to the UI of the mailbox that visually groups selected messages. Conventional systems only provide threads on messages within the same conversation; however, the generated thread in Step 412 is not bound by whether the messages are from the same conversation and groups, and visually displays these messages based on their overall time, contacts and content similarity to message m. As such, the generated thread comprises the messages selected from Step 410. In Step 414, the generated thread is caused to be displayed within the mailbox UI in related to the display of message m.

According to some embodiments, the execution of Equation 1 as discussed above in relation to Process 400 can be performed via executing machine learning (ML) technology, such as, for example, linear regression analysis, decision tree analysis, random forest analysis and Deep Neural Networks (DNNs, Hidden Markov Models (HMMs), Support Vector Machines (SVMs), Bayesian Methods, and the like. For example, a training data set of message pairs indicating "positive" or "negative" pairs can be utilized, where the "positive" pairs represent related messages (e.g., pairs of messages selected within a predetermined time frame by a user (e.g., within 15 minute time frame), pairs of messages appearing as query results a predetermined number of times), and the "negative" pairs represent unrelated messages (e.g., messages failing to be identified within any other pair from a search occurring a predetermined number of time (e.g., 20 times)). As messages are analyzed using the ML functionality mentioned above, they are compared against the positive and negative pairs, and should they be similar, the search engine 300 designates them accordingly based on the training data they are similar to. In some embodiments, the threshold discussed above is trained, set and/or adjusted according to the characteristics of the "positive" and "negative" message pairs.

FIGS. 5A-5C provide non-limiting examples of the capabilities and functionality of the search engine 300 disclosed above in relation to FIGS. 3-4 and Process 400. FIG. 5A depicts a user's mailbox (or inbox) user interface (UI): item 500, which visibly displays the folder portion 502 of the inbox (which lists an interactive listing of folders a user can set up, interact with and the like), the message listing 504, scroll bar 508 and interface objects 508a-508c.

Message listing 504 is a listing of the messaging activity within the inbox 500. Within the listing 504, is message 506—which for purposes of this example is message m. As discussed above, message 506 can be identified as being of interest to a user based on any type of user interaction that provides an indication that the user is interested in that specific message (for example, simply hovering the user's mouse over the message can be an indication that the user is interested in the message).

The scroll bar 508 draws its timeline from the activity in the message listing 504, such that as new messages are received, the scroll bar 508 is updated to reflect new messages more recently received than older messages already populated in the inbox 500. Scroll bar 508 also depicts interface items 508a-508c. Items 508a-508c provide a variety of functionality to inbox 500. Each item provides a visible indication as to when the latest similarity score computation was performed for message 506. That is, viewing the scroll bar 508 as a timeline, where the top of the scroll bar 508 coincides with a time the latest message was received, item 508a represents a scoring of message 506 that was performed after receiving the latest message but more recently than the scoring of item 508b, and the same for item 508c. Items 508a-508c are also interactive, such that upon receiving a selection, a display of the messages determined to be related to message 506 (as determined from Process 400 discussed above) can be provided within UI 500 as item 506a—as depicted in FIG. 5B, discussed below. The messages determined to be related to messages 506 can be different for each item 508a-508c (because they are determined at different times having differing pools of messages); therefore, a view of the differing related message sets can be toggled by selected between each item 508a-508c.

In FIG. 5B, UI 500 depicts message 506 being selected (or identified as in Steps 402-404), where the generated thread (item 506a) of related messages (determined from Steps 408-414) is displayed. In some embodiments, the thread interface 506a can be displayed as a connected interface to message 506; in some embodiments, the interface 506a can be displayed in a separate window; and in some embodiments, interface 506a can be overlaid UI 500.

By way of non-limiting example, as illustrated in FIG. 5B, message 506 was identified as being of interest to the user of inbox 500 (e.g., based on the user selecting the message, as indicated by the "blacked out" selection box within item 506), and the set of messages within thread interface 506a was identified as being related to message 506. For example, since message 506 relates to a message from "car.com" about a "Honda", the messages in thread 506a also correspond to a "Honda". For example, one message is from the user's friend "Jane Doe" and it involves a reply message to the user wondering if the user still wants to buy her car. Another example message is from "Autotrader.com" providing deals for Hondas this month. And, another example message is an email from the user's mother wondering if she ever purchased the Honda.

As with other types of thread messages, each message included in item 506a is fully interactive, where a user can select on and send reply messages (or even draft new messages to those senders), directly from the UI 500 and element 506a.

FIG. 5C provides an example embodiment where a user is drafting a message 552 from a message drafting window 550 and is provided an interface 554 that depicts a generated thread 554 of related messages. In some embodiments, the messages in thread 554 can be based on a selected message (e.g., message 506 from FIG. 5B was selected and used as a basis for drafting a reply message, as depicted in FIG. 5C). In some embodiments, while a user is drafting a message, and or has completed the message and submits a send instruction (or prior to the send instruction), Process 400 can be executed such that thread 554 is generated so that the user can view messages related to his/her drafted message. In some embodiments, instead of thread 554 appearing in a drafted message (as in FIG. 5C), the thread 554 can be viewed in a similar manner as in FIG. 5C but within an expanded version of a selected message (e.g., message 506), where the thread 554 is displayed in a similar manner within the expanded message version. In some embodiments, the thread interface element 554 can be displayed in any portion of a message and/or the message UI, including above the message, below the message, within the message, in a right or left rail or sidebar, in a toolbar, and the like.

Therefore, as illustrated in FIGS. 3-5C, and discussed in relation to such figures, the disclosed systems and methods provide a novel message search feature that presents users with a set of related messages. This set is identified with respect to a message m in which the user is currently demonstrating interest. The user's interest in message m can be triggered by any native operation that leads to the message being highlighted/marked in the regular time view. Related messages are identified based on three dimensions: i) time, ii) contacts, and iii) content. The set of related messages is computed according to a function $f$ that gets as input a pair of messages (m1, m2) and computes their similarity (Equation 1, as discussed above). In some embodiments, the function can be computed offline by a learning process (MLR), and is based on similarity measures that correspond to the attributes mentioned above.

For example, given a message m, the set of related messages comprises the messages closest to m according to $f$. The related messages feature provided by the search framework disclosed herein provides the user with a novel way to be provided with a set of messages that are closely related, without the need to originate a search query and/or switch to a different state within the message application, platform or service (e.g., switch from a message view to a message search). The disclosed search feature enables the user to scan his mailbox more efficiently, and instantly be provided with messages of interest. Additionally, it expands the notion of a thread from messages that belong to the same correspondence, as in conventional systems, to messages with a similar context across all messages that have been received/sent over time within the mailbox.

FIG. 6 is a work flow example 600 for serving relevant digital media content associated with or comprising advertisements (e.g., digital advertisement content) based on the information associated with a message and its related messages, as discussed above in relation to FIGS. 3-5C. Such information, referred to as "message information" for reference purposes only, can include, but is not limited to, information associated with a message of interest (i.e., message m, as discussed above), its related messages, the attributes, content and features utilized in the similarity analysis discussed above, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, message information is identified. As discussed above, the message information can be based any of the information from processes outlined above with respect to FIGS. 3-5C. For purposes of this disclosure, Process 600 will refer to single message and related message set as the basis for serving a digital advertisement(s); however, it should not be construed as limiting, as any number of messages, as well as programs used and/or content items included therein can form such basis, without departing from the scope of the instant disclosure.

In Step 604, a context is determined based on the identified message information. This context forms a basis for serving advertisements related to the message information. In some embodiments, the context can be in accordance with the content (e.g., context) of the message m or the related message set, as discussed above in relation to FIG. 4. For example, a message m and its related messages can each correspond to the topic of hunting—for example, message m is a notification from the state that hunting season is about to begin, and the messages in the related message set include, but are not limited to, messages from friends discussing a hunting trip and other messages from hunting gear providers that indicate the latest stock of gear has arrived); therefore, the context identified in Step 604 can be related to "hunting" or other "in-season outdoors activities" and can be leveraged in order to identify digital ad content related to such activities, as discussed herein in relation to the steps of Process 600. In some embodiments, the identification of the context from Step 604 can occur before, during and/or after the analysis detailed above with respect to Process 400, or it can be a separate process altogether, or some combination thereof.

In Step 606, the determined context is communicated (or shared) with an advertisement platform comprising an advertisement server 130 and ad database. Upon receipt of the context, the advertisement server 130 performs (e.g., is caused to perform as per instructions received from the device executing the search engine 300) a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to view, compose, send, receive and/or render messages or media. Step 612. In some embodiments, the selected advertisement is sent directly to each user's (sender and recipient of each message) computing device. In some embodiments, the selected advertisement is displayed within a portion of the interface or within an overlaying or pop-up interface associated with the messaging interface used to send/receive messages.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   detecting, via a computing device, an action related to a message within an inbox of a user, said action providing an indication to said computing device that said message is of interest to said user;

analyzing, via the computing device, said message, said analysis comprising parsing said message, and based on said parsing, identifying time, contact and content features of said message;

identifying, via the computing device, a pool of messages within said inbox;

analyzing, via the computing device, each message in said pool of messages, said analysis comprising parsing each message in said pool of messages, and based on said parsing, identifying time, contact and content features of each message in said pool of messages;

computing, via the computing device, a similarity measurement between said message and each message in said pool of messages, said computation based on the time, contact and content features of said message, and the time, contact and content features of each message in said pool of messages;

identifying, via the computing device, a set of related messages based on said similarity measurement, said identifying comprising comparing said similarity measurement of each message in said pool of messages against a threshold, said set of related messages comprising messages that satisfy said threshold;

generating, via the computing device, a thread interface for display within said inbox, said thread interface comprising an interactive display of said set of related messages;

automatically causing a display, via the computing device, of said thread interface within a portion of the inbox in response to said detection of the action, said caused display of the thread interface being at a position within said inbox that is adjacent to a position of said message in the inbox, said thread interface enabling the user to view and interact with any of the related messages displayed within the thread interface; and automatically causing modification of the inbox, via the computing device, by adding indicators within a second portion of the inbox, each indicator individually corresponding to one of the related messages displayed within the thread interface, each indicator corresponding to a time the similarity measurement is computed for a respective message of the related messages, each indicator providing a positional identifier related to a position of a respective message within the inbox, each indicator being interactive such that in response to selection of an indicator, the related set of messages are displayed within the thread interface in accordance with the corresponding similarity measurement associated with the selected indicator.

2. The method of claim 1, wherein said computation of said similarity measurement between said message and each message in said pool of messages is performed prior to said detection of said action.

3. The method of claim 2, wherein said similarity measurements are stored in a database associated with said computing device, and upon detection of said action, said stored measurements are retrieved.

4. The method of claim 1, wherein said action comprises a computerized operation selected from a group consisting of: receiving said message in said inbox; drafting said message, viewing said message, forwarding said message, deleting said message, saving said message; responding to said message, responding to a message with said message, changing a view of said inbox, flagging or marking said message, categorizing said message, and hovering an interface object over said message.

5. The method of claim 1, wherein said similarity measurement is defined by a number of dimensions that corresponds to a number of features identified during said analysis.

6. The method of claim 1, wherein said computation of the similarity measurement is based upon:

A (sim {time}_(m1, m2), sim_{contact}(m1, m2), sim_{content}(m1, m2)), wherein m1 represents said message;

wherein m2 represents a message within said pool of messages;

wherein (sim_{time}(m1, m2) represents a similarity determination between the time features of m1 and m2;

wherein sim_{contact}(m1, m2) represents a similarity determination between the contact features of m1 and m2;

wherein sim_{content}(m1, m2) represents a similarity determination between the content features of m1 and m2; and wherein A is an aggregate function of the time, contact and content similarity determinations.

7. The method of claim 1, further comprising:

analyzing said action, and based on said action, determining a type of action performed respective to said message;

comparing said type of action to a listing of operations; and determining, based on said comparison, that said action is providing said indication.

8. The method of claim 1, wherein said analysis steps are performed automatically, without user input, upon detecting said action.

9. The method of claim 1, further comprising:

generating an interface object within a scroll bar of said inbox upon said identification of said set of related messages, said interface object related to said generated thread and corresponding to a time when said thread was generated, wherein interaction with said interface object enables a display of said generated thread within a portion of said inbox, and wherein said interface object is caused to be displayed within said scroll bar in a position that represents said time.

10. The method of claim 1, wherein said pool of messages comprises every other message in said inbox besides said message.

11. The method of claim 1, wherein said pool of messages comprises a subset of messages within said inbox, said subset selected according to a criteria that indicates a relationship with said message.

12. The method of claim 1, further comprising:

analyzing, via the computing device executing a machine learning (ML) algorithm, the time, contact and content features of said message, and based on said ML analysis, performing said similarity computation in order to determine said set of related messages.

13. A non-transitory computer-readable storage medium tangibly encoded with computer-executable instructions, that when executed by a processor associated with a computing device, performs a method comprising:

detecting, via the computing device, an action related to a message within an inbox of a user, said action providing an indication to said computing device that said message is of interest to said user;

analyzing, via the computing device, said message, said analysis comprising parsing said message, and based on said parsing, identifying time, contact and content features of said message;

identifying, via the computing device, a pool of messages within said inbox;

analyzing, via the computing device, each message in said pool of messages, said analysis comprising parsing each message in said pool of messages, and based on said parsing, identifying time, contact and content features of each message in said pool of messages;

computing, via the computing device, a similarity measurement between said message and each message in said pool of messages, said computation based on the time, contact and content features of said message, and the time, contact and content features of each message in said pool of messages;

identifying, via the computing device, a set of related messages based on said similarity measurement, said identifying comprising comparing said similarity measurement of each message in said pool of messages against a threshold, said set of related messages comprising messages that satisfy said threshold;

generating, via the computing device, a thread interface for display within said inbox, said thread interface comprising an interactive display of said set of related messages;

automatically causing a display, via the computing device, of said thread interface within a portion of the inbox in response to said detection of the action, said caused display of the thread interface being at a position within said inbox that is adjacent to a position of said message in the inbox, said thread interface enabling the user to view and interact with any of the related messages displayed within the thread interface; and automatically causing modification of the inbox, via the computing device, by adding indicators within a second portion of the inbox, each indicator individually corresponding to one of the related messages displayed within the thread interface, each indicator corresponding to a time the similarity measurement is computed for a respective message of the related messages, each indicator providing a positional identifier related to a position of a respective message within the inbox, each indicator being interactive such that in response to selection of an indicator, the related set of messages are displayed within the thread interface in accordance with the corresponding similarity measurement associated with the selected indicator.

14. The non-transitory computer-readable storage medium of claim 13, wherein said computation of said similarity measurement between said message and each message in said pool of messages is performed prior to said detection of said action, wherein said similarity measurements are stored in a database associated with said computing device, and upon detection of said action, said stored measurements are retrieved.

15. The non-transitory computer-readable storage medium of claim 13, wherein said similarity measurement is defined by a number of dimensions that corresponds to a number of features identified during said analysis.

16. The non-transitory computer-readable storage medium of claim 13, wherein said computation of the similarity measurement is based upon:

A (sim_{time}(m1, m2), sim_{contact}(m1, m2), sim_{content}(m1, m2)), wherein m1 represents said message;
wherein m2 represents a message within said pool of messages;
wherein (sim_{time}(m1, m2) represents a similarity determination between the time features of m1 and m2;
wherein sim_{contact}(m1, m2) represents a similarity determination between the contact features of m1 and m2;
wherein sim_{content}(m1, m2) represents a similarity determination between the content features of m1 and m2; and
wherein A is an aggregate function of the time, contact and content similarity determinations.

17. The non-transitory computer-readable storage medium of claim 13, further comprising:
analyzing said action, and based on said action, determining a type of action performed respective to said message;
comparing said type of action to a listing of operations; and
determining, based on said comparison, that said action is providing said indication.

18. The non-transitory computer-readable storage medium of claim 13, further comprising:
generating an interface object within a scroll bar of said inbox upon said identification of said set of related messages, said interface object related to said generated thread and corresponding to a time when said thread was generated,
wherein interaction with said interface object enables a display of said generated thread within a portion of said inbox, and
wherein said interface object is caused to be displayed within said scroll bar in a position that represents said time.

19. A computing device comprising:
a processor; and
a non-transitory computer-readable storage medium for tangibly storing thereon program logic for execution by the processor, the program logic comprising:
logic executed by the processor for detecting, via the computing device, an action related to a message within an inbox of a user, said action providing an indication to said computing device that said message is of interest to said user;
logic executed by the processor for analyzing, via the computing device, said message, said analysis comprising parsing said message, and based on said parsing, identifying time, contact and content features of said message;
logic executed by the processor for identifying, via the computing device, a pool of messages within said inbox;
logic executed by the processor for analyzing, via the computing device, each message in said pool of messages, said analysis comprising parsing each message in said pool of messages, and based on said parsing, identifying time, contact and content features of each message in said pool of messages;
logic executed by the processor for computing, via the computing device, a similarity measurement between said message and each message in said pool of messages, said computation based on the time, contact and content features of said message, and the time, contact and content features of each message in said pool of messages;
logic executed by the processor for identifying, via the computing device, a set of related messages based on said similarity measurement, said identifying comprising comparing said similarity measurement of each message in said pool of messages against a threshold, said set of related messages comprising messages that satisfy said threshold;

logic executed by the processor for generating, via the computing device, a thread interface for display within said inbox, said thread interface comprising an interactive display of said set of related messages;

logic executed by the processor for automatically causing a display, via the computing device, of said thread interface within a portion of the inbox in response to said detection of the action, said caused display of the thread interface being at a position within said inbox that is adjacent to a position of said message in the inbox, said thread interface enabling the user to view and interact with any of the related messages displayed within the thread interface; and logic executed by the processor for automatically causing modification of the inbox, via the computing device, by adding indicators within a second portion of the inbox, each indicator individually corresponding to one of the related messages displayed within the thread interface, each indicator corresponding to a time the similarity measurement is computed for a respective message of the related messages, each indicator providing a positional identifier related to a position of a respective message within the inbox, each indicator being interactive such that in response to selection of an indicator, the related set of messages are displayed within the thread interface in accordance with the corresponding similarity measurement associated with the selected indicator.

* * * * *